United States Patent [19]

MacKenzie

[11] 4,014,582
[45] Mar. 29, 1977

[54] VEHICLE BUMPER SYSTEM

[76] Inventor: Kenneth W. MacKenzie, 27945 Honeycomb Drive, Saugus, Calif. 91350

[22] Filed: June 30, 1975

[21] Appl. No.: 591,824

[52] U.S. Cl. .............................................. 293/84
[51] Int. Cl.² ........................................ B60R 19/08
[58] Field of Search ............... 293/71 R, 71 P, 70, 293/89, 98, 85, 84, 86, 72, 73, 71

[56] References Cited
UNITED STATES PATENTS

| | | | |
|---|---|---|---|
| 2,659,595 | 11/1953 | Coda | 293/71 R |
| 2,793,900 | 5/1957 | Marshall | 293/71 R |
| 3,203,722 | 8/1965 | Zahorodny | 293/71 P X |
| 3,369,634 | 2/1968 | Mazelsky | 293/70 X |
| 3,700,273 | 10/1972 | Jackson et al. | 293/89 X |
| 3,781,049 | 12/1973 | Cantrell | 293/89 X |
| 3,797,872 | 3/1974 | Watanabe | 293/70 X |

*Primary Examiner*—Stanley H. Tollberg
*Assistant Examiner*—Norman L. Stack, Jr.

[57] ABSTRACT

A vehicle bumper system and apparatus is disclosed herein having a plate mountable on the chassis of a vehicle which supports an inflatable member carried by a holder. The holder is resiliently supported on the plate by means of a pair of mountings taking the form of a hydraulic shock absorber and a leaf spring arrangement. The inflatable member is reinforced by layers of fibers as well as reinforcing rods that are critically located so as to form mounting lobes detachably connected to the opposing edges of an elongated slot formed in the holder.

4 Claims, 4 Drawing Figures

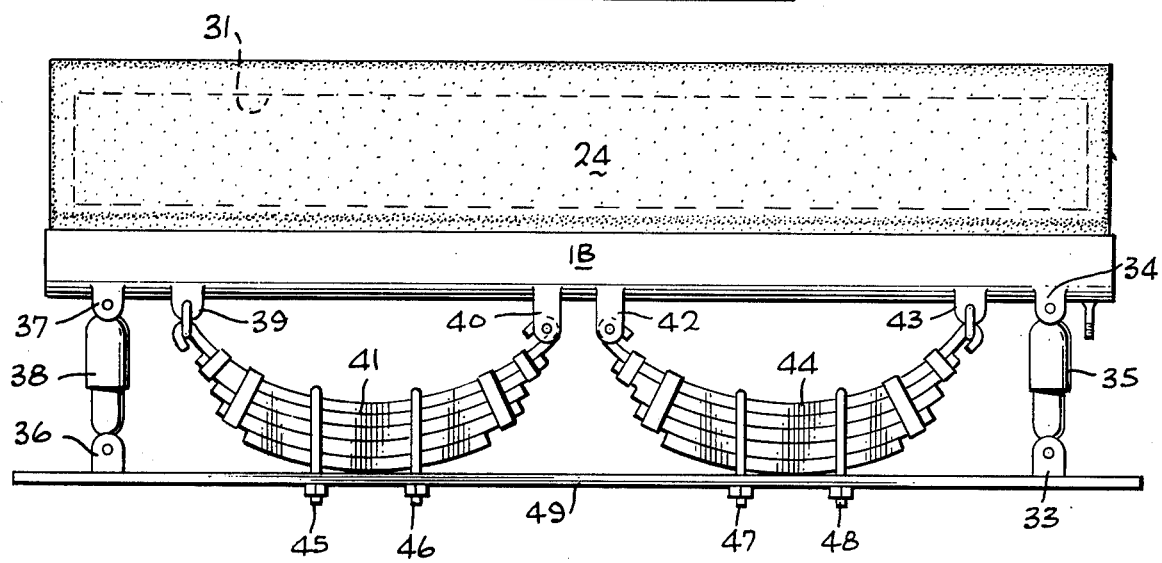
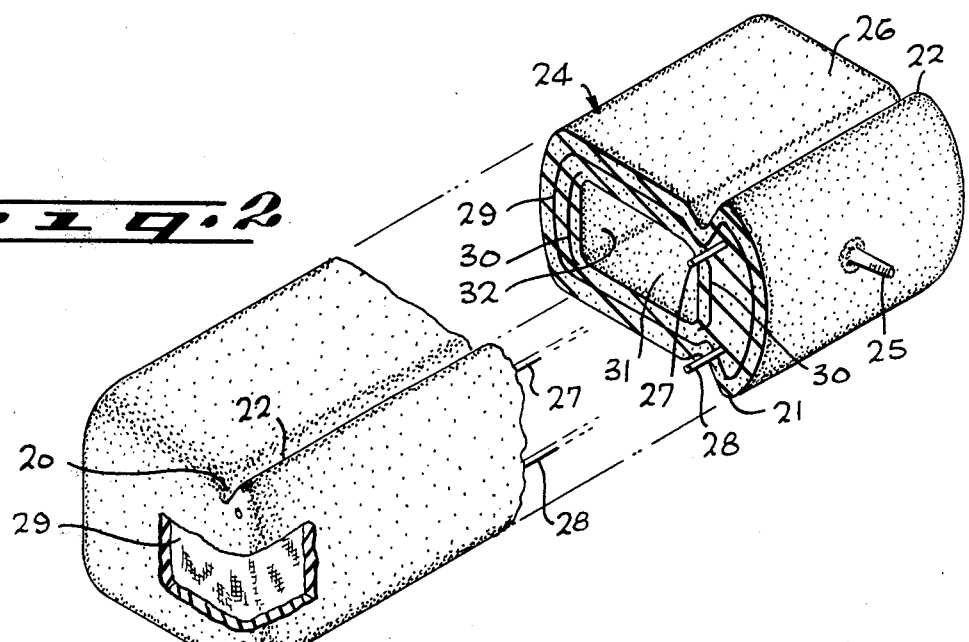
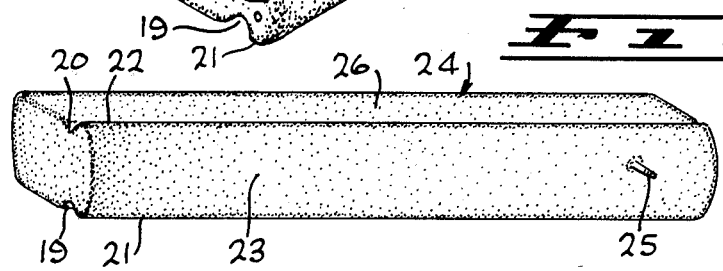
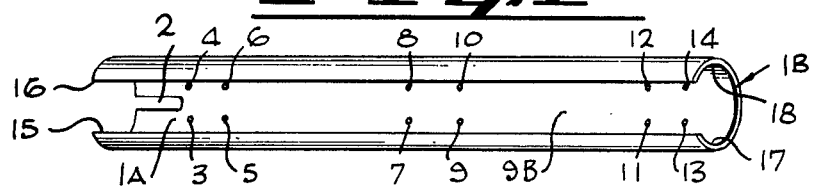

VEHICLE BUMPER SYSTEM

BACKGROUND OF THE INVENTION

1. Field of the Invention

The present invention relates to automobile safety devices and more particularly to a novel bumper for vehicles including an inflatable member resiliently carried on the chassis of the vehicle.

2. Background of the Invention

In the past, it has been the conventional practice to mount rigid bumpers on the fore and aft ends of an automotive chassis so that personnel and property may be protected in the case of a collision. In more recent times, the solid bumpers have been replaced by shock absorbing bumpers taking the form of liquid bags, deformable telescoping tube sections and/or a plurality of resilient mounting devices. Although, some of these prior bumpers have been successful in preventing injury and damage at low speeds, overall protection of the vehicle and its occupants is not gained due to the fact that prior devices have a very narrow range of operation before destruction and these devices are not able to withstand or transmit applied loads into the chassis when impact is encountered.

Obviously, self destructing devices, such as water bags and the like, require frequent replacement which is expensive and time consuming. Other devices which may purport to provide a wide range of impact load dissipation are extremely expensive and require a substantial physical size which renders the devices impractical for modern day passenger and commercial vehicles. Therefore, a long standing need has existed to provide an improved vehicle bumper and shock absorbing apparatus that may be readily mounted on conventional vehicles and which afford substantial load absorption and transmission into the chassis upon impact during collision or the like.

SUMMARY OF THE INVENTION

Accordingly, the above problems and difficulties are obviated by the present invention which provides a novel bumper system and apparatus therefor having a plate directly mountable onto the frame or chassis of a conventional vehicle so that the shock absorbing means carried on the plate outwardly extend from the chassis. The shock absorbing means includes an inflatable member which is carried on a holder that is movably mounted on the plate by a shock absorbing means and a resilient means. In one form of the invention, the shock absorbing means is a hydraulic piston and cylinder arrangement having the opposite ends of the device pivotally carried between the holder and the plate while the resilient means takes the form of a pair of leaf spring arrangements or assemblies operably connected between the inflatable member holder and the plate.

Therefore, it is among the primary objects of the present invention to provide a simple and effective bumper arrangement employing pneumatic, spring action, and hydraulic means which when assembled and mounted as a functioning shock absorbing and load transmitting bumper on the front or rear of a vehicle provides a measure of collision or impact protection to the vehicle and its occupants.

Another object of the present invention is to provide a novel shock absorbing and impact apparatus for vehicles which will reduce the likelihood of injury to passengers by lessening the possibility of engine compartment components being pushed into passenger compartments during collision.

Still another object of the present invention is to provide a novel bumper arrangement for vehicles which includes an inflatable member mounted by spring and hydraulic means for protecting a vehicle and its occupants from encountering dangerous deceleration loads.

Yet another object of the present invention is to provide a novel bumper system for a vehicle which is economical to manufacture, easy to install and one which will permit normal operation of the vehicle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a top plan view showing the novel vehicle bumper system and apparatus;

FIG. 2 is a perspective, fragmentary view, partially in sections, of the inflatable member used in the apparatus shown in FIG. 1;

FIG. 3 is an elevational view of the inflatable members shown in FIG. 2; and

FIG. 4 is a rear elevational view of the holder for mounting the inflatable member as used in the apparatus shown in FIG. 1.

DESCRIPTION OF THE PREFERRED EMBODIMENT

Referring to FIG. 1, it can be seen that the vehicle bumper of the present invention includes an elongated mounting plate 49 that may be suitably mounted to the front or rear end of a vehicle chassis. However, it is to be understood that the plate or part 49 may represent the actual chassis itself to which the remainder of the bumper element may be attached. In this connection, hydraulic shock absorbers 35 and 38 are mounted at one end to plate 49 and pivotally attached at their opposite end to the rear side of a holder 1B.

Hydraulic shock absorbers 35 and 38 are mounted behind the holder 1B with their length parallel to the road surface. Also mounted behind the holder are leaf springs 41 and 44. The leaf springs and hydraulic shock absorbers are mounted in such a way as to provide shock absorption when the front portion of the bumper inflatable member or carcass 24 collides with another object or when another object colliedes with it. The front inflatable member or carcass portion 24 is also intended to provide a measure of impact protection.

Plate or part 49 is intended to represent the vehicle frame to which the bumper system may be attached. Parts 33, 34, 36 and 37 are holder brackets for the hydraulic shock absorbers. Element 39 is a spring pivot bracket allowing the spring to articulate at two different points. Element 40 is a spring pivot bracket which provides a point of articulation for the leaf spring 41. Parts 42 and 43 provide the same above functions for the spring 44. The impact elements of the present invention or bumpers are preferably located at front and rear ends of a vehicle ahead of the frame and body construction so as to receive impact of collision before the construction behind. The pivot for the shock absorbers provide complete articulation of the impact element regardless of the direction from which the collision occurs. Many vectors or permutations of directional impact loads are contemplated.

The inflatable member or carcass is illustrated in a fragmentary sectional rear view in FIG. 2 and is designed to be constructed of flexible, air tight material such as rubber, synthetic rubber or other flexible material. The member or carcass is reinforced with layers of fabric 29 and 30 which will be composed of flexible nylon, or polyester, or fiberglass or steel fabric or combination thereof, or other suitable reinforcing fabric. The airtight air chamber 31 of the carcass is encompassed by the outer layer 26 which is rubber, synthetic rubber or other flexible airtight material within which the carcass fabric ply layer 29 is integrated in the carcass and completely covers the inside, providing reinforcement, and overlapping the carcass rods or beads 27 and 28 thus holding them tight to the carcass. The carcass fabric layer 30 also completely covers the interior of the carcass and is integrated to the carcass for strength. By adding additional fabric plies, the carcass can be made stronger. A common type air valve 25 in carcass FIG. 3 is provided for inflation or deflation purposes. The carcass air chamber 31 is airtight when inflated and it is to be inflated to make the bumper functional after assembly. The final interior carcass layer 32 is also formed of rubber, or synthetic rubber, or other flexible airtight material, and it is an integral part of the carcass forming the carcass air chamber 31 walls.

The carcass top bead 28 is a wire rod or other material of suitable rigidity to provide reinforcement to the carcass top flange lip 22. This carcass bead 28 will run the interior length of the carcass top flange lip 22 from one end of the carcass to the other end of the carcass.

The carcass bottom bead 27 will also be composed of wire or other material of suitable rigidity to provide reinforcement to the carcass bottom flange lip 21. This carcass bead 27 will run the interior length of the carcass bottom flange lip 21 from one end of the carcass to the other end of the carcass.

As seen from the rear, the inflatable member or carcass 24 as shown in FIG. 3 is illustrated fully inflated, not mated to the carcass holder of FIG. 4. It would have an enclosed generalized rectangular box shape, or modification thereof, with all six sides enclosed and airtight. The carcass 24 as in FIG. 3 will have near its rear face a flange lip 22 on top running from one end to the other and a flange lip 21 running parallel to it on bottom from one end to the other. The carcass top flange lip 22 is designed to engage the holder top flange cavity 18, the carcass bottom flange lip 21 is designed to engage the holder flange cavity 17 and at the same time the holder top flange lip 16 will engage the carcass top flange angle 20 while the holder bottom flange 15 will engage the carcass bottom flange angle 19. As a result, the carcass in FIG. 3, once fully inflated, through its air valve 25 will hold fast to the holder of FIG. 4.

The carcass 24 front face is the part which would normally come into contact first, during impact or collision. The rear male portion of the carcass as shown in FIG. 3 is the carcass rear face 23. The carcass air valve 25 is fitted into the valve slot 2 of the holder as in FIG. 4.

The holder as shown in FIG. 4 is a rigid receptacle constructed of metal or rigid material and it is illustrated showing a view of its front face. FIG. 4, when viewed from either end, would have a generalized letter C shape in cross-section. Lengthwise it is approximately as long as the carcass 24. The holder has a longitudinal, centrally disposed slot in its face, extending its entire length and being defined by parallel edges indicated by holder top flange 16 and holder bottom flange 15. The holder will also have a female cavity 1A designed to hold the carcass rear male face 23 upon assembly of the carcass FIG. 3 to the holder FIG. 4. The holder's rear face may have the above mentioned springs and hydraulic shock absorbers mounted to it.

The holder in FIG. 4 may also contain a valve slot 2 as indicated at its rear for the purpose of fit and also to provide access to carcass FIG. 3 air valve 25. The holder mounting holes 3 through 14 are located through the rear face 9B of the holder and may be used to attach the spring assemblies and hydraulic shocks to the holder or attach the holder to a vehicle independently. Part 16 of the holder in FIG. 4 is a flange lip engaged with the carcass of FIG. 3 at groove or valley 20. Parts 45, 46, 47 and 48 are U-bolts for holding the leaf springs 41 and 44 in place.

If the carcass of FIG. 3 and the holder of FIG. 4 are assembled independent of the hydraulic shock absorbers 35 and 37, and independent of the springs 41 and 44, then it may be mounted to a vehicle independently to provide a singular pneumatic shock absorbing bumper.

By adding hydraulic shock absorbers to the assembled carcass and holder without springs then my bumper system will provide a pneumatic and hydraulic shock absorbing system.

By adding only springs to the assembled carcass and holder without the hydraulic shock absorbers, may bumper system will function by means of a combined spring and pneumatic action.

By combining all the components as illustrated in FIG. 1, my bumper system will function by means of a combined spring, pneumatic and hydraulic action.

In view of the foregoing, it can be seen that the novel bumper system and apparatus of the present invention provides a shock absorbing means and applied load transmission to the chassis so that vehicle property and occupants are adequately protected. The leaf spring arrangements are articulated between the plate and the inflatable member holder while articulation is further achieved by implying pivotal piston and cylinder arrangements on the outboard side of the leaf spring assemblies. By these latter means, the inflatable member is suitably supported so that shock encountered will be absorbed by the piston and cylinder assemblages as well as the leaf spring assembly. The initial impact of shock will be absorbed by the resiliency of the inflatable member depending upon the inflation medium. Should the inflatable member rupture or need replacement, the elongated slot formed in the holder provides a suitable means for receiving a replacement inflatable member by means of the valleys or grooves provided in the inflatable member. It should be kept in mind that for some purposes, a single leaf spring arrangement may be employed and in other arrangements other articulated resilient means may be substituted therefor.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A bumper system and apparatus therefor to be carried on a chassis of a vehicle, the combination comprising:
   an impact receiving member;
   articulated resilient means mounting said impact receiving member to said chassis;
   said articulated resilient means providing both hydraulic and spring shock absorption and said impact receiving member provides pneumatic shock absorption;
   said impact receiving member is an elongated inflatable member and said resilient means includes a pair of leaf spring assemblies;
   said impact receiving member further includes a pair of piston and cylinder assemblages separated by said leaf spring assemblies;
   a holder releasably carrying said inflatable member and said articulated resilient means pivotally interconnecting said holder to said vehicle chassis; and
   said inflatable member includes a carcass having a pair of grooves provided on opposite sides thereof adjacent an elongated bead and said holder includes a slot for slidably receiving said inflatable member whereby opposing edges of said holder defining said slot slidably engage with said grooves and said bead respectively.

2. The invention as defined in claim 1 wherein each of said leaf spring assemblies are fixedly secured at their mid-sections to said chassis and their opposite ends are pivotally coupled to said holder.

3. The invention as defined in claim 2 including means for inflating said inflatable member and means provided on said holder for accommodating said inflation means during insert and removal of said inflatable from said holder.

4. The invention as defined in claim 3 wherein said beads include a rod reinforcement embedded into a casing confining said inflatable member.

* * * * *